W. E. DERRICK.

Horse Hay Fork.

No. 92,175.

Patented July 6, 1869.

Witnesses:

Inventor:

WILLIAM E. DERRICK, OF JORDAN, NEW YORK, ASSIGNOR TO HIMSELF AND GEORGE B. GARRISON, OF SAME PLACE.

Letters Patent No. 92,175, dated July 6, 1869.

IMPROVEMENT IN HORSE HAY-FORKS.

The Schedule referred to in these Letters Patent and making part of the same.

*To all whom it may concern:*

Be it known that I, WILLIAM E. DERRICK, of Jordan, in the county of Onondaga, and State of New York, have invented a new and useful Improvement in Horse Hay-Forks; and I do hereby declare that the following is a full, clear, and exact description thereof, which will enable those skilled in the art to make and use the same, reference being had to the accompanying drawings, forming part of this specification, in which—

Figure 1:
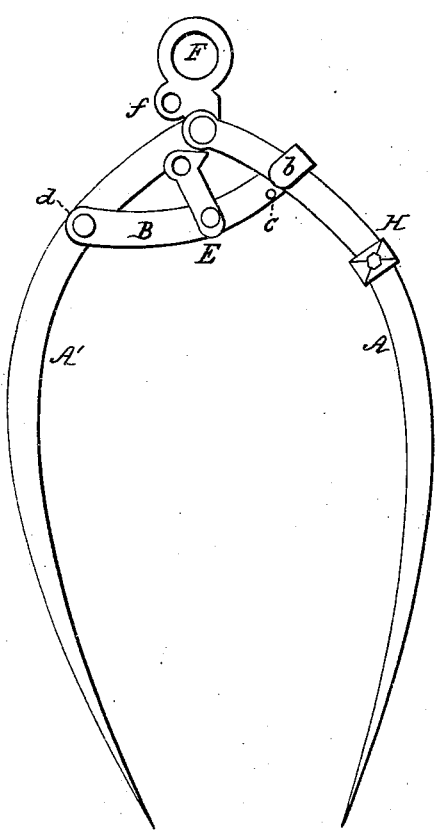
Figure 2:
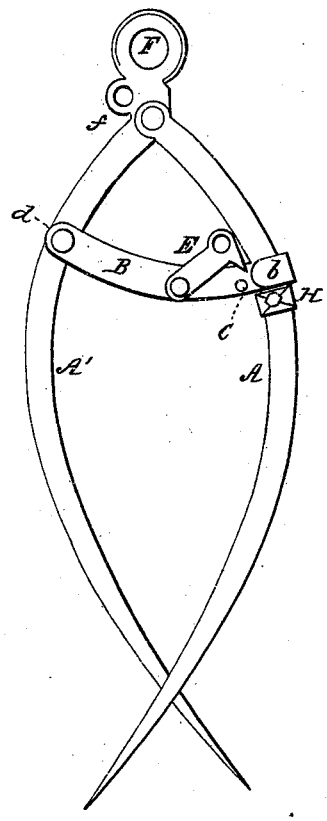

Figure 1 shows the fork in an open position, and
Figure 2 shows the same in a closed position.

Similar letters of reference indicate like parts.

This invention relates to a new and improved lock, in connection with a pair of curved, or caliper-shaped tines, whereby a very simple and efficient fork is obtained, as hereinafter more fully explained.

In the accompanying drawings—

A' A are a pair of curved tines, pivoted together at their upper extremities.

To the tine A', is secured a swinging arm, B, by means of a pivot, d, the opposite end of said pivot having a hook and pin, b c, which form a loop for embracing the tine A.

As the loop, or swinging end of arm B is elevated, the fork is opened, as shown in fig. 1, and when the arm is depressed, the fork is closed, as shown in fig. 2.

For locking the fork in a closed position, a cam-lever, E, is pivoted to the central portion of the arm B, and by pressing this lever down against the tine A, the arm B becomes fixed upon said tine A.

For discharging or opening the fork, a tripping-cord is rove through a small eye, $f$, in the suspending-link F, and secured to the swinging end of cam-lever $f$, so that by pulling on said cord, the cam-lever is disengaged, and the loop $b$ $c$ allowed to slide freely on the tine A, and leave the tines free to swing on their pivot.

H is an adjustable collar, or stop, which is fixed on the tine A, at any desired point, by means of a set-screw; and by changing the position of this stop, the throw of the arm B is made variable, so that the fork can be closed more or less, as desired.

The curve of the tines A' A is such, that the fork closes itself as it is pushed into the hay.

By these means, I obtain a fork that is strong and simple in construction, and is easily operated.

Having thus described my invention,

What I claim as new, and desire to secure by Letters Patent, is—

In connection with the curved tines A' A, the swinging arm B, one end of said arm being pivoted to tine A', and its opposite end sliding vertically on the opposite tine A, with a cam-lever, E, for securing the arm upon the tine A, the whole arranged and operating substantially as herein described.

The above specification of my invention signed by me, this 4th day of May, 1869.

WILLIAM E. DERRICK.

Witnesses:
WM. J. DODGE,
F. A. MORLEY.